US 6,585,088 B1

(12) United States Patent
Fontaine et al.

(10) Patent No.: US 6,585,088 B1
(45) Date of Patent: Jul. 1, 2003

(54) BRAKING SYSTEM FOR BRAKING A ROTOR RELATIVE TO A STATOR

(75) Inventors: Jacques Fontaine, Verberie (FR); Claude Manon, Retheuil (FR); Stéphane Vidal, Longueil Ste Marie (FR)

(73) Assignee: Poclain Hydraulics Industrie, Verberie (FR)

( * ) Notice: Subject to any disclaimer, the term of this patent is extended or adjusted under 35 U.S.C. 154(b) by 0 days.

(21) Appl. No.: 09/567,596

(22) Filed: May 10, 2000

(51) Int. Cl.[7] .................. F16D 65/24; F16D 55/22; F16D 55/18
(52) U.S. Cl. ............. 188/170; 188/72.3; 188/72.4; 188/71.5; 188/369; 188/367; 60/435; 192/85 AA; 192/106 F
(58) Field of Search ............... 188/71.5, 72.1, 188/72.3, 72.4, 170, 264 P, 366–370; 303/71, 9.61, 9.76; 60/435, 436; 91/416; 192/85 AA, 106 F

(56) References Cited

U.S. PATENT DOCUMENTS

| 2,740,512 A | * | 4/1956 | Fischer | 192/85 AA |
|---|---|---|---|---|
| 3,362,481 A | * | 1/1968 | Steinhagen | 192/85 AA |
| 3,602,347 A | * | 8/1971 | Yamaguchi et al. | 192/106 F |
| 3,647,037 A | * | 3/1972 | Toma | 192/106 F |
| 3,680,666 A | * | 8/1972 | Sommer | 188/170 |
| 3,927,737 A | * | 12/1975 | Prillinger et al. | 188/106 F |
| 3,974,743 A | * | 8/1976 | Ivey | 91/422 |
| 3,974,896 A | * | 8/1976 | Rach | 188/170 |
| 3,999,634 A | * | 12/1976 | Howell | 188/106 P |
| 4,057,297 A | * | 11/1977 | Beck et al. | 303/71 |
| 4,256,350 A | * | 3/1981 | Hoefer | 303/6 M |
| 4,261,455 A | * | 4/1981 | Uitenbroek et al. | 192/106 F |
| 4,271,951 A | * | 6/1981 | Nishimura et al. | 192/106 F |
| 4,442,929 A | * | 4/1984 | Uchida | 192/52.4 |
| 4,557,109 A | * | 12/1985 | Nagahara et al. | 60/436 |
| 4,934,218 A | * | 6/1990 | Takase et al. | 477/154 |
| 5,186,284 A | * | 2/1993 | Lamela et al. | 188/71.8 |
| 5,259,489 A | * | 11/1993 | Kimura et al. | 192/85 AA |
| 5,333,705 A | * | 8/1994 | Lemaire et al. | 188/71.5 |
| 5,511,644 A | * | 4/1996 | Murata | 192/85 AA |
| 5,555,500 A | * | 9/1996 | Ogawa et al. | 364/424.05 |
| 5,697,765 A | * | 12/1997 | Grahl | 417/273 |
| 5,752,588 A | * | 5/1998 | Reichert et al. | 188/77 R |
| 5,895,099 A | * | 4/1999 | Diecke et al. | 303/9.61 |
| 5,992,578 A | * | 11/1999 | Lallier | 188/72.3 |
| 6,206,163 B1 | * | 3/2001 | Schneider | 192/113.35 |
| 6,347,695 B1 | * | 2/2002 | Kuhn et al. | 192/70.12 |

FOREIGN PATENT DOCUMENTS

| FR | 2672940 A1 | * | 8/1992 |
| FR | 2695695 A1 | * | 3/1994 |
| GB | 2123502 A | * | 2/1984 |
| GB | 2172677 A | * | 9/1986 |
| GB | 2178809 A | * | 2/1987 |
| GB | 2239907 A | * | 7/1991 |
| JP | 633536 U | * | 1/1988 |
| JP | 1172636 A | * | 7/1989 |

* cited by examiner

Primary Examiner—Jack Lavinder
Assistant Examiner—Melody M. Burch
(74) Attorney, Agent, or Firm—Ladas & Parry

(57) ABSTRACT

A braking system for braking a rotor relative to a stator, the braking system comprising braking means respectively secured to the rotor and to the stator, a brake piston, return means for returning the piston to its braking position, a braking chamber, and a brake release chamber, which chambers are interconnected via a link duct serving to generate a flow of fluid in an assisted braking situation in which the braking chamber is connected to a fluid feed duct, while the brake release chamber is connected to a fluid return duct. The link duct is equipped with means for limiting the flow of the fluid at least in the direction going from the brake release chamber to the braking chamber.

13 Claims, 4 Drawing Sheets

BRAKING SYSTEM FOR BRAKING A ROTOR RELATIVE TO A STATOR

The present invention relates to a braking system for braking a rotor relative to a stator, the braking system comprising first braking means secured to the rotor, second braking means secured to the stator, a brake piston suitable for taking up a brake release position and a braking position in which it urges the first and second braking means into braking co-operation, the system further comprising resilient return means continuously urging the brake piston into its braking position, a braking chamber suitable for being fed with a fluid under pressure to urge the brake piston towards its braking position, a brake release chamber suitable for being fed with fluid under pressure to urge the brake piston towards its brake release position, and control means for controlling feeding said chambers with fluid.

For example, the braking system can be the braking system of a hydraulic motor, it being possible for the rotor to be constituted by the cylinder block, or by the casing of the motor, depending on whether the motor is of the rotary cylinder block type or of the rotary cam type. For example, the motor can be a motor having radial pistons, or a motor of the type described in Documents EP 0 869 279 or EP 0 887 548.

The braking means are, for example, constituted by brake plates, constrained to rotate respectively with the stator and with the rotor, and interleaved with one another. Other braking means, e.g. using the teeth of a positive clutch, may be considered.

When the brake release chamber is not fed with fluid under pressure, the brake piston is brought into its braking position by resilient return means. For example, this braking situation applies during parking for a prolonged period.

Under certain conditions, feeding the braking chamber with fluid can be used by way of braking assistance, in order to reinforce the braking effect obtained by the resilient return means.

That is what is proposed, for example, in Documents U.S. Pat. No. 3,680,666, U.S. Pat. No. 4,057,297, and U.S. Pat. No. 3,547,234.

Document U.S. Pat. No. 4,557,109 shows a system in which a chamber containing the resilient return means communicates with the brake release chamber via a restriction which is provided in the brake piston in a manner such that, once the brake piston has reached its brake release position, the restriction is closed. That makes it possible to empty the brake release chamber without having to use a drain or a specific shuttle valve.

As indicated above, during a prolonged halt, the parking braking is used, under the effect of the resilient return means only. In order to allow the rotor to rotate, brake release is performed by feeding the brake release chamber with fluid under pressure so as to displace the brake piston against the return force of the resilient return means. However, it is then sometimes difficult to perform emergency braking. After a prolonged halt, the temperature of the fluid decreases and its viscosity increases. This phenomenon is accentuated when the ambient temperature is low, e.g. lower than 0° C. In order to perform braking, it is necessary to cease to feed the brake release chamber with fluid and to empty the fluid therefrom. Because of its high viscosity, the fluid finds it difficult to flow out from the brake release chamber, and so pressure opposing the thrust of the return means remains in said chamber. That prevents the brake from engaging rapidly.

An object of the invention is to remedy that drawback, by making fast and reliable braking possible, even shortly after the rotor has started rotating following a prolonged halt.

This object is achieved by the facts that the braking chamber and the brake release chamber are interconnected via a link duct serving to generate a flow of fluid in an assisted braking situation in which the braking chamber is connected to a fluid feed duct, while the brake release chamber is connected to a fluid return duct, and that the link duct is equipped with means for limiting the flow of the fluid through said duct at least in the direction going from the brake release chamber to the braking chamber.

By means of these provisions, it is possible to brake the rotor rapidly relative to the stator by assisting the return effect of the resilient return means by feeding the braking chamber with fluid, thereby making braking possible even when the fluid is "cold", i.e. when its viscosity is higher than the viscosity it presents in a stabilized operating situation. At the same time, the braking chamber is connected to the brake release chamber, thereby making it possible for the fluid to flow between the two chambers. This flow contributes to heating the fluid rapidly and thus to decreasing its viscosity, so that the above-mentioned problems disappear rapidly.

The link duct is organized such that, during the assisted braking stage, the forces exerted on the piston due to the resilient return means and to the pressure of fluid in the braking chamber are greater than any antagonistic forces due to the persistence of fluid pressure in the brake release chamber. During the assisted braking stage, the viscous fluid finds it difficult to flow out of the brake release chamber, but it also finds it relatively difficult to flow from braking chamber to the brake release chamber, so that use is made of the high viscosity of the fluid to achieve the assisted braking effect.

However, the flow of the fluid through the link duct is limited in the direction going from the brake release chamber to the braking chamber, so that a conventional brake release situation is nevertheless obtained.

Advantageously, the means for limiting the flow of fluid comprise a non-return valve enabling the fluid to flow only in the direction going from the braking chamber to the brake release chamber.

Advantageously, the system is provided with a restriction disposed in the link duct between the braking chamber and the brake release chamber.

This restriction limits the flow of fluid as a function of its section. It is advantageously disposed in series with the non-return valve in the link duct. In which case, the valve prevents the fluid from flowing through the link duct in the direction going from the brake-release chamber to the braking chamber. In the other direction, the flow is limited by the section of the restriction, thereby making it possible to ensure that a high enough fluid pressure prevails in the braking chamber when the braking chamber is fed with fluid under pressure.

In an advantageous embodiment, the control means for controlling feeding the braking chamber and the brake release chamber with fluid are suitable for causing the system to take up an assisted braking configuration in which the braking chamber communicates with the fluid feed duct while the brake release chamber communicates with the fluid return duct, a brake release configuration in which the brake release chamber communicates with the fluid feed duct, and an unassisted braking configuration in which the brake release chamber communicates with a fluid return, while the braking chamber is isolated from the fluid feed duct.

By means of these provisions, it is possible for the assisted braking configuration to be used only in a critical situation, in particular the situation that occurs on starting, when the viscosity of the fluid is higher than normal. When the critical nature of the situation disappears, the braking can be performed unassisted, without any fluid being consumed to feed the braking chamber.

In which case, the system is advantageously provided with means for detecting a parameter related to the viscosity of the fluid in the braking chamber, and with means for causing braking to take place in the assisted braking configuration whenever the detected parameter reveals viscosity that is greater than a given viscosity, and for causing braking to take place in the unassisted braking configuration whenever said parameter reveals a viscosity lower than said given viscosity.

Thus, when braking is applied, the choice between assisted braking and unassisted braking takes place automatically, as a function of the detected parameter.

For example, this parameter may be chosen from the temperature of the fluid, a head loss, and the temperature of a part of the system that is in contact with the fluid.

Advantageously, the braking means are situated in the brake release chamber. The fluid that is in contact with them is thus heated rapidly.

The invention will be well understood and its advantages will appear more clearly on reading the following detailed description of an embodiment shown by way of non-limiting example. The description is given with reference to the accompanying drawings, in which:

A braking system for braking a rotor relative to a stator, the braking system comprising braking means respectively secured to the rotor and to the stator, a brake piston, return means for returning the piston to its braking position, a braking chamber, and a brake release chamber, which chambers are interconnected via a link duct serving to generate a flow of fluid in an assisted braking situation in which the braking chamber is connected to a fluid feed duct, while the brake release chamber is connected to a fluid return duct. The link duct is equipped with means for limiting the flow of the fluid at least in the direction going from the brake release chamber to the braking chamber.

DETAILED DESCRIPTION

Figure 1:
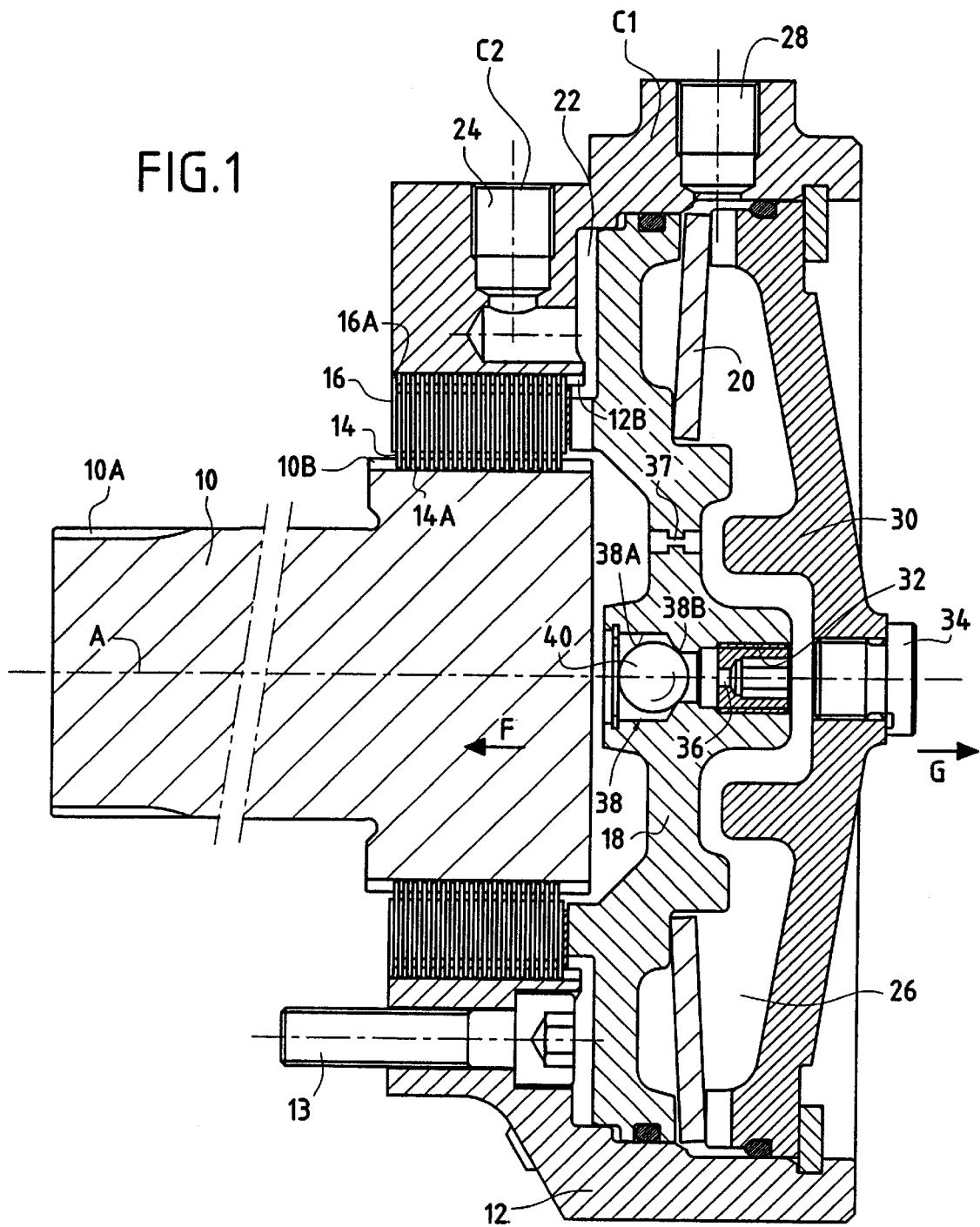
FIGS. 1, 2, and 3 are axial section views of two variants of a braking system of the invention.

As shown in FIG. 1, the rotor is constituted by a shaft 10, e.g. a shaft of a hydraulic motor. The shaft is provided with fluting 10A so as to be suitable for being rotated by the cylinder block of said motor. The stator is constituted by a portion 12 of the brake casing that is, for example, secured to the casing of the motor by screws 13. The first braking means comprise a first series of annular brake plates 14 which are constrained to rotate with the rotor 10 via their inner ends 14A and which co-operate with fluting 10B or the like provided on the rotor. The second braking means comprise a second series of annular brake plates 16 which, via their outer peripheries 16A, are prevented from rotating relative to the stator 12, e.g. by means of a system of fluting 12B. Conventionally, the plates of the first series and the plates of the second series are interleaved between one another.

The braking system includes a braking piston 18 suitable for co-operating with the plates. On the opposite side from the piston, the plates are held in abutment (by an abutment member that is not shown). Thus, on being moved towards the plates in the direction F, the piston pushes the plates against one another to achieve the braking. On being moved in the opposite direction G, the piston enables the plates to move apart from one another, thereby enabling the rotor to rotate.

The piston 18 is urged continuously towards its braking position by a return spring 20 such as a spring washer of the Belleville type that pushes it back in the direction F.

A brake release chamber 22 is provided on that side of the piston which faces the brake plates. Via a brake release duct 24, it can be fed with fluid under pressure so as to urge the piston in the direction G.

In the advantageous example shown, the brake plates 14 and 16 are disposed in said chamber 22. On that side of the piston which is opposite from the chamber 22, the system includes a braking chamber 26 that can be fed via a braking duct 28 so as to assist the spring 20 in urging said piston in the direction F.

The chamber 26 is defined between that face of the brake piston 18 which is opposite from the plates 14 and 16 and a brake cover 30 in the form of an end plate. Sealing devices are provided between the piece 12 of the brake casing and firstly the piston 18 and secondly the over 30.

In a parked situation, when the system is not fed with fluid, the spring 20 effects parking braking. It may however be desirable to perform emergency brake release, e.g. in order to tow a vehicle equipped with a motor including a brake of the invention. For this purpose, the brake piston 18 is provided with a tapped hole 32. The cover 30 is provided with a bore which, in an operating situation, is closed off by a stopper 34. In order to perform the emergency brake release, the stopper 34 can be removed and a emergency brake release screw whose head bears against the cover 30 can co-operate with the tapped hole 32 so as to bring the brake piston back in the direction G. Prior to this co-operation, a part 36 whose function is specified below and which is initially disposed in the tapped hole 32 is removed by being unscrewed.

The braking chamber 26 and the brake release chamber 22 are interconnected by a link duct 38. Thus, when the chamber 26 is fed with fluid, said fluid can flow from the braking chamber 26 into the brake release chamber 22 via the duct 38. In this example, this duct includes a first portion 38A in which a moving member such as a ball 40 is disposed. The ball co-operates with a seat 38B to form a non-return valve preventing fluid from flowing in the direction going from the brake release chamber 22 to the braking chamber 26. In the advantageous example shown, the second portion of the link duct is constituted by the abovementioned tapped hole 32, and the part 36 constitutes a restriction which defines a given through section, e.g. of diameter of about 2 mm.

The link duct 38 is formed in simple manner by making use of the tapped hole 32 that is necessary for emergency brake release. In this example, this duct is centered on the axis of rotation A of the rotor.

Insofar as the brake piston separates the braking chamber from the brake release chamber, it is advantageous to provide the link duct in said piston, as shown in FIG. 1. It is also possible to provide the link duct in the brake casing 12.

In addition, the spring 20 is disposed in the braking chamber 26.

A reverse passageway 37 provided with a restriction can enable fluid to flow from the brake release chamber 22 into the braking chamber 26. It may be equipped with a non-return valve that is inverted relative to the non-return valve 40, or else, as shown in FIG. 1, it may enable fluid to flow in both directions between the chambers 22 and 26. The section 37 of the passageway is very small and preferably smaller than the section of the restriction 36. For example, it may have a diameter of about 0.5 mm. The passageway 37 generates leakage from the chamber 22 to the chamber 26. As in Patent U.S. Pat. No. 4,557,109, it facilitates emptying the brake release chamber 22. It may be equipped with means enabling it to be closed off in the stabilized brake release situation (e.g. as a function of the position of the piston 18) so as to prevent the leakage from the chamber 22 from being permanent.

Figure 2:
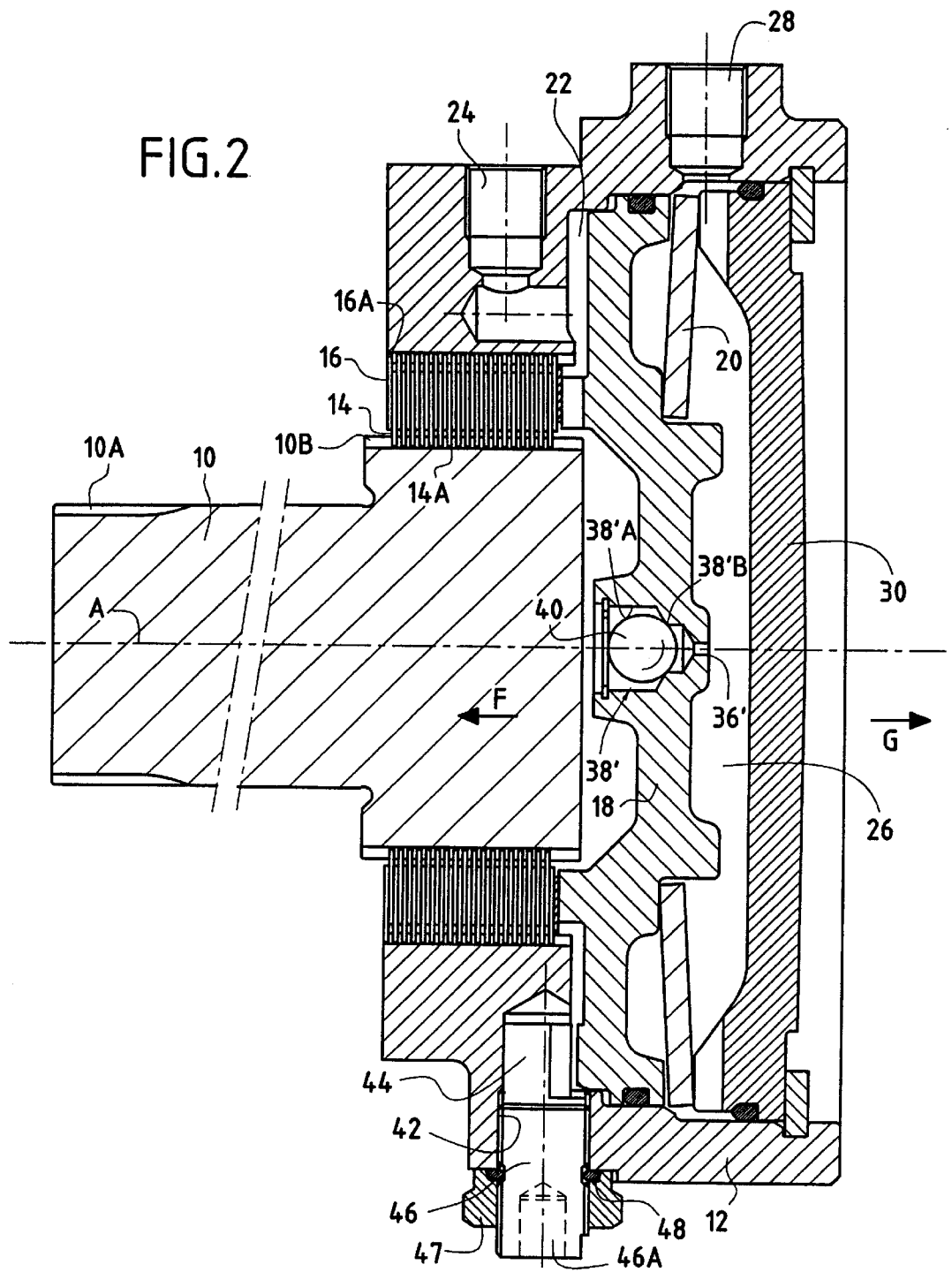

FIG. 2 shows a system analogous to the system shown in FIG. 1, and in which the link duct 38' also includes a first portion 38'A containing a moving member 40 forming a non-return valve by co-operating with a seat 38'B, and a restriction 36' constituted by a portion of the duct 38' that is of suitable section. The link duct 38' is also provided in the piston 18 and centered on the axis A.

In the variant shown in FIG. 2, the emergency brake release means differ from those shown in FIG. 1. The end plate forming the cover 30 of the brake is uninterrupted but the emergency brake release means are accessible from an axial face of the system, which face is formed on an axial side of the casing 12. A radial bore 42 is provided in the axial wall of the casing 12 so that, over a portion of its length that is situated towards the inside of the system, it has an opening into the brake release chamber 22, which opening faces the brake-release piston 18.

A stud in the form of a cam 44 is disposed inside said bore 42. The stud can be turned from the outside via a control rod 46 which is threaded and which co-operates with a tapped portion of the bore 42. The stud 44 is prevented from rotating by a lock nut 47, with sealing being provided by a gasket 48. The rod 46 has an actuating head 46A. By means of a tool, it is possible to turn it, e.g. through one quarter of a turn in order to place a large-diameter region of the cam facing the piston 18, and thus to push said piston in the direction G. In a normal operating situation, a small-diameter portion of the cam faces the piston.

Figure 3:
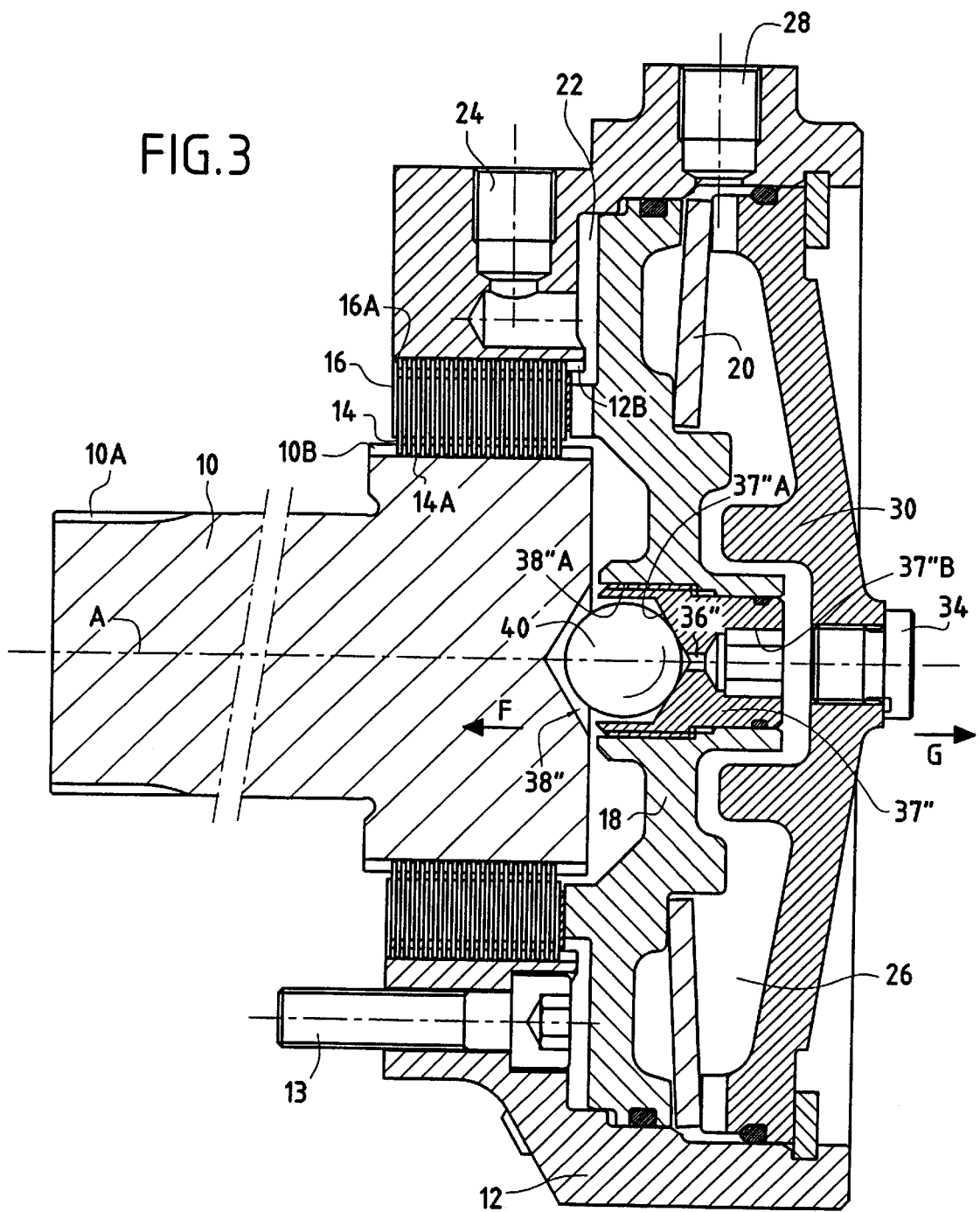

FIG. 3 shows a system analogous to the systems of FIGS. 1 and 2, and identical references are used for like elements. The link duct 38" is formed by a bore which is provided in the brake piston 18 and which includes a tapped portion 38"A. A part 37" having a bore 36" which forms the restriction is screwed into the tapped portion. The part 37" has a wall 37"A which faces the brake release chamber 22 and which forms a seat for the ball 40 of the non-return valve.

On the same side as the stopper 34, the part 37" has an engagement surface 37"B for a tool for driving it in rotation. In order to perform the emergency brake release, the stopper 34 is removed, and the part 37" is rotated so that it advances in the direction F. The ball 40 comes into abutment against the shaft 10 so that, by continuing to rotate the part 37", the brake piston 18 is displaced in the direction G.

With the braking systems shown in FIGS. 1 to 3, parking braking can be obtained by the return effect of the spring 20 only. Brake release, enabling the rotor to rotate, is obtained by feeding the chamber 22 with fluid via the duct 24. Starting from such a brake release situation, assisted braking can be obtained by connecting the duct 24 to a fluid return in order to enable the chamber 22 to be emptied, and by connecting the duct 28 to a feed in order to enable the braking chamber 26 to be fed with fluid. In which case, the fluid fed into the chamber 26 flows via the link duct 38, 38' or 38" into the brake release chamber 22 and out through the duct 24. Thus, a flow of fluid is generated that contributes to heating up the fluid and to reducing its viscosity. The diameter of the restriction 36 or 36' makes it possible to ensure that, in this assisted braking situation, the fluid pressure in the braking chamber is high enough to displace the piston in the direction F even if it is difficult for the fluid to flow out via the duct 24 due to high viscosity.

Figures 4, 5:
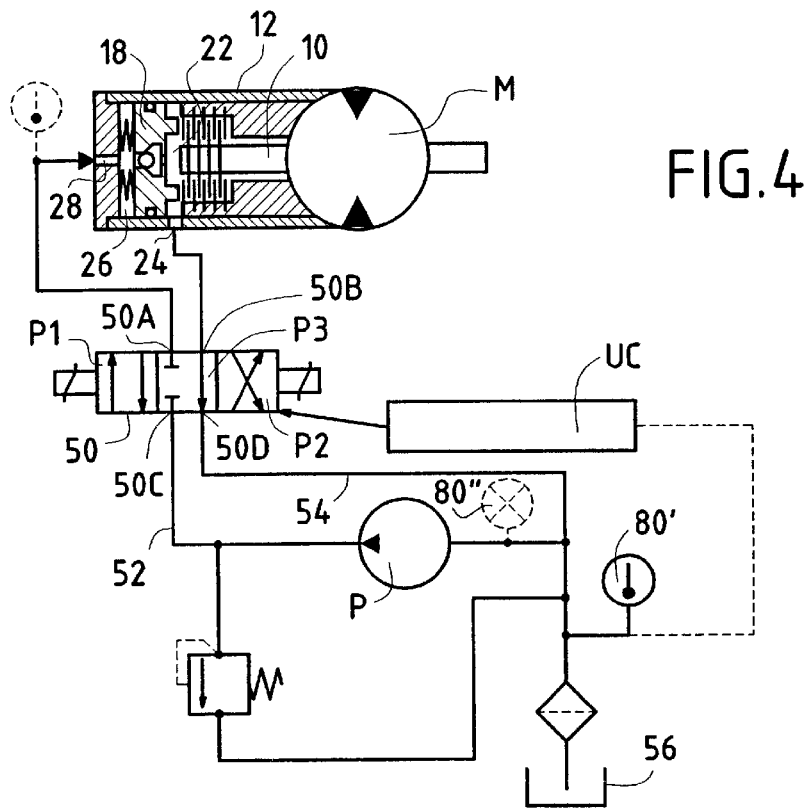
FIGS. 4 and 5 show two variants of the control circuits for controlling such a braking system.

FIG. 4 shows a control circuit for controlling a braking system of the invention. This system is used to brake a hydraulic motor M. It is possible to recognize the rotor 10 constituting the brake shaft, and the stator 12 that constitutes a portion of the casing of the motor. It is also possible to recognize the brake release chamber 22 with its brake release duct 24, and the braking chamber 26 with its braking duct 28.

The fluid feed circuit includes a pump P, e.g. a booster pump of a hydraulic circuit whose main pump (not shown) feeds the motor M. The control valve 50 for controlling the brake system is, for example, an electrically-controlled valve, and is capable of taking up three positions.

The valve 50 has four ports, namely a braking port 50A which is connected continuously to the braking chamber 26 via the braking duct 28, a brake release port 50B which is connected continuously to the to the brake release chamber 22 via the duct 24, a feed port 50C connected continuously to the feed duct 52 connected to the outlet orifice of the pump P, and a return port 50D connected continuously to the return duct 54.

The fluid return 54 is connected to a pressure-free tank 56. Advantageously, the duct 54 connects the return port 50D to the inlet of the pump P. A circuit that is shorter is thus obtained, thereby making it easier for the temperature of the fluid and of the control circuit to rise. Thus, in this example, the duct 54 is connected both to the inlet of the pump and to the tank 56.

In the position P1, the ports 50A and 50C are interconnected while being isolated from the ports 50B and 50D which are themselves interconnected, so that the valve 50 connects the braking duct 28 to the fluid feed 52, while it connects the braking duct 24 to the fluid return 54.

The position P1 corresponds to an assisted braking configuration.

The valve 50 includes a second position P2, in which the ports 50A and 50D are interconnected, while being isolated from the ports 50B and 50C which are themselves interconnected, so that the ducts 28 and 24 are connected respectively to the fluid return duct 54 and to the fluid feed duct 52. The second position thus corresponds to the brake release configuration, in which the brake release chamber is fed with fluid.

The valve 50 also has a third position P3 in which the ports 50A and 50C are isolated while the ports 50B and 50D are interconnected, so that the duct 28 is isolated while the duct 24 is connected to the fluid return duct 54. This corresponds to an unassisted braking configuration.

In the example shown in FIG. 4, the brake duct 28 is isolated from any other duct in the unassisted braking configuration. It should be noted that the fluid contained in the braking chamber 26 can empty into the brake release chamber 22 via the link duct during the brake release situation preceding the unassisted braking configuration. It is possible, in the unassisted braking configuration, to choose to connect the braking duct 28 directly to a fluid return duct, or even to the pressure-free tank 56, in which case, in the position P3, the port 50A can be connected to the return 54, e.g. by being connected to the port 50D.

FIG. 5 shows a variant of the control circuit of the same braking system. This circuit includes two valves 60 and 70, each of which has two positions making it possible to cause the braking system to go between its configurations, namely the assisted braking configuration, the unassisted braking configuration, and the brake release configuration.

The first valve 60 is provided with four ports, namely a braking port 60A connected continuously to the braking chamber 26, a brake-release port 60B connected continuously to the brake release chamber 22, a feed port 60C connected continuously to the feed duct 52 connected to the outlet of the pump P, and a return port 60D connected continuously to a fluid return, e.g. the pressure-free tank 56.

The second two-position valve 70 has a braking branch port 70A which is connected continuously to the braking chamber 26, a feed branch port 70C which is connected continuously to the feed duct 52, and a return duct port 70D which is connected continuously to the fluid return such as the tank 56.

The valve 60 is shown in a first position P'1 in which it interconnects the brake release port 60B and the return port 60D while isolating the braking port 60A and the feed duct 60C. This position P'1 is referred to as the "braking position". This valve 60 may further take up a brake release position P'2 in which its braking port 60A and its return port 60D are interconnected, while its brake release port 60B and its feed port 60C are interconnected while being isolated from the other ports.

The second valve 70 is shown in a "neutral" position P'3 in which its braking branch port 70A and its return duct port 70D are interconnected while being isolated from the port 70C. It can take up a second position P'4 referred to as the "braking assistance position" in which the braking branch port 70A is connected to the feed branch port 70C while being isolated from the port 70D.

It can be understood that, when the valve 70 is in its neutral position P'3, the unassisted braking configuration is obtained when the valve 60 is in the position P'1, while the brake release configuration is obtained when the valve 60 is in the position P'2.

In contrast, when the valve 70 is in its braking assistance position P'4, the assisted braking configuration is obtained when the valve 60 is in its position P'1, while the position P'2 cannot be used (otherwise it would connect the outlet of the pump to the tank 56).

The control system for controlling the valves 60 and 70, which are constituted in this example by electrically-controlled valves, includes a first switch I1 which causes the valve 60 to go between its positions P'1 and P'2. It also includes a second switch I2 which makes it possible to cause the valve 70 to go between its positions P'3 and P'4, P'4 being used only it P'2 is not. The switch I1 is actuated by the user of the braking system, e.g. the driver of a vehicle equipped with said system. The switch I2 is preferably actuated automatically, e.g. as a function of a parameter detected by a detector 80. When said parameter reveals viscosity higher than a given viscosity, the switch I2 is closed automatically so as to cause the valve 70 to take up the position P'4. In which case, when the driver actuates the switch I1, the braking configuration is necessarily an assisted braking configuration. When the detected parameter reveals viscosity that is low enough, the switch I2 can be opened automatically so as to cause the valve 70 to take up its position P'3, so that, as a function of the position of the switch I1, the configuration goes from a brake release configuration to an unassisted braking configuration.

In the example shown in FIG. 4, the valve is caused to go between its three positions by electrical systems managed by a control unit UC as a function of a parameter detected by a detector 80' and revealing the viscosity of the fluid. When the viscosity is deemed to be low enough, the valve 50 is switched from its position P2 to its position P3 in order to perform unassisted braking, whereas, so long as the viscosity remains higher than a given viscosity, said valve is switched from its position P2 to its position P1 in order to perform assisted braking.

For example, the detected parameter may be the temperature of the fluid in the vicinity of the inlet orifice of the pump P, as indicated by the positions of the detectors shown in uninterrupted lines. For example, the viscosity is deemed insufficient so long as said temperature remains lower than 50° F., i.e. about 10° C. As indicated in dashed lines in FIG. 4, the temperature sensor may be disposed at other locations, e.g. at the inlet of the braking chamber 28.

FIG. 1 shows the various possible positions for the sensor which, for example, may be placed on the body of the stator (position C1) or else in the duct 24 (position C2). The detected parameter may be temperature but it may also be a head loss through a given restriction, e.g. a filter placed on the inlet of the pump, or the temperature of a part in contact with the fluid, such as the temperature of the stator. The sensors 80 and 80' shown in uninterrupted lines are temperature sensors. The sensor 80" shown in dashed lines in FIG. 4 is a pressure sensor. Data pre-recorded in performance charts makes it possible to determine the viscosity on the basis of the value of said parameter. Naturally, the viscosity is deemed suitable as a function of various parameters specific to the system in question, and in particular as a function of the diameter of the duct 24.

It should be noted that disposing the braking means 14 and 16 in the brake release chamber makes it possible, when the rotor is in the operating situation, to heat up the brake release fluid against the parts moving relative to one another, so that its viscosity decreases more rapidly.

In practice, prior to starting the rotor, an internal combustion engine is started that serves to operate the pump so as to generate the circulation of fluid in the circuit.

On starting the engine after the vehicle has been parked for a prolonged period, it is possible for the control means for controlling the braking system to be placed automatically in a position corresponding to the assisted braking configuration so as to generate fluid flow enabling the fluid to be heated up. Then the configuration goes over to the brake release configuration in order to allow the rotor to rotate. When the brake is applied for the first time, the control means are urged either into the assisted braking configuration, or, if it exists, into the unassisted braking configuration, as a function of the viscosity of the fluid.

The advantage of such a control procedure is that it makes it possible to obtain an assisted braking configuration (i.e. to apply high braking torque) only when necessary. This makes it possible to extend the life span of the brake.

The circuits shown in FIGS. 4 and 5 may make it possible to control simultaneously the brakes of a plurality of motors of the same machine or of the same vehicle.

What is claimed is:

1. A braking system comprising first braking means secured to a rotor, second braking means secured to a stator, a brake piston suitable for taking up a brake release position and a braking position in which it urges the first and second braking means into braking cooperation, the system further comprising resilient return means continuously urging the brake piston into its braking position, a braking chamber suitable for being fed with a fluid under pressure to urge the brake piston towards its braking position, a brake release chamber suitable for being fed with fluid under pressure to urge the brake piston towards its brake release position, and control means for controlling feeding said chambers with fluid, the braking chamber and the brake release chamber being interconnected via a link duct serving to generate a flow of fluid in an assisted braking situation in which the braking chamber is connected to a fluid feed duct, while the brake release chamber is connected to a fluid return duct, and the link duct being equipped with means for limiting the flow of the fluid through said link duct at least in the direction going from the brake release chamber to the braking chamber.

2. A system according to claim 1, wherein said means for limiting the flow of fluid comprise a non-return valve enabling the fluid to flow only in the direction going from the braking chamber to the brake release chamber.

3. A system according to claim 1, the system being provided with a restriction disposed in the link duct between the braking chamber and the brake release chamber.

4. A system according to claim 2, further comprising a restriction disposed in the link duct between the braking chamber and the brake release chamber, said restriction and said non-return valve being disposed in series in said link duct.

5. A system according to claim 1, wherein the link duct is disposed in the brake piston.

6. A system according to claim 1, wherein the resilient return means are disposed in the braking chamber.

7. A system according to claim 1, wherein the control means for controlling feeding the braking chamber and the brake release chamber with said fluid are suitable for causing the system to take up an assisted braking configuration in which the braking chamber communicates with the fluid feed duct while the brake release chamber communicates with the fluid return duct, a brake release configuration in which the brake release chamber communicates with the fluid feed duct, and an unassisted braking configuration in which the brake release chamber communicates with a fluid return, while the braking chamber is isolated from the fluid feed duct.

8. A system according to claim 7, the system being provided with means for detecting a parameter related to the viscosity of the fluid in the braking chamber, and with means for causing braking to take place in the assisted braking configuration whenever the detected parameter reveals viscosity that is greater than a given viscosity, and for causing braking to take place in the unassisted braking configuration whenever said parameter reveals a viscosity lower than said given viscosity.

9. A system according to claim 8, the system being provided with means for detecting a parameter chosen from the temperature of the fluid, a head loss, and the temperature of a part of the system that is in contact with the fluid.

10. A system according to claim 7, wherein the means for controlling feeding the braking chamber and the brake release chamber with said fluid comprise a three-position valve having a braking port connected continuously to the braking chamber, a brake release port connected continuously to the brake release chamber, a feed port connected continuously to the fluid feed duct and a return port connected continuously to the fluid return duct, and wherein the three-position valve is suitable for taking up an assisted braking position in which the braking port is connected to the feed port, while the brake release port is connected to the return port, a brake release position in which the brake release port is connected to the feed port, while the braking port is connected to the return port, and an unassisted braking position in which the brake release port is connected to the return port while the feed port is isolated.

11. A system according to claim 7, wherein the means for controlling feeding the braking chamber and the brake release chamber with said fluid comprise a first valve which has a braking port connected continuously to the braking chamber, a brake release port connected continuously to the brake release chamber, a feed port connected continuously to the fluid feed duct, and a return port connected continuously to a fluid return, together with a second valve which has a braking branch port connected continuously to the braking chamber, a feed branch port connected continuously to the feed duct, and a return duct port connected to a fluid return, and wherein the first valve is suitable for taking up a braking position in which it interconnects its brake release port and its return port while isolating the braking port and the feed port, and a brake release position in which it interconnects its braking port and its return port, and it interconnects its brake release port and its feed port, while the second valve is suitable for taking up a braking assistance position in which it interconnects its braking branch port and its feed branch port, and a neutral position in which it interconnects its braking branch port and its return duct port.

12. A system according to claim 1, wherein the fluid feed duct to which the braking chamber is connected is also connected to an outlet orifice of a pump, and wherein the fluid return duct is connected to an inlet orifice of said pump.

13. A system according to claim 1, wherein the first and second braking means are disposed in the brake release chamber.

* * * * *